US011919038B2

(12) United States Patent
Meier et al.

(10) Patent No.: US 11,919,038 B2
(45) Date of Patent: Mar. 5, 2024

(54) SANITARY FITTING HAVING A TRANSLUCENT COATING

(71) Applicant: GROHE AG, Hemer (DE)

(72) Inventors: Torsten Meier, Neuss (DE); David Mainka, Iserlohn (DE)

(73) Assignee: GROHE AG, Hemer (DE)

( * ) Notice: Subject to any disclaimer, the term of this patent is extended or adjusted under 35 U.S.C. 154(b) by 400 days.

(21) Appl. No.: 17/413,701

(22) PCT Filed: Feb. 4, 2020

(86) PCT No.: PCT/EP2020/052702
§ 371 (c)(1),
(2) Date: Jun. 14, 2021

(87) PCT Pub. No.: WO2020/169333
PCT Pub. Date: Aug. 27, 2020

(65) Prior Publication Data
US 2022/0288634 A1 Sep. 15, 2022

(30) Foreign Application Priority Data
Feb. 20, 2019 (DE) ..................... 10 2019 104 234.8

(51) Int. Cl.
*B05D 7/00* (2006.01)
*B05D 3/04* (2006.01)

(52) U.S. Cl.
CPC ............. *B05D 7/53* (2013.01); *B05D 3/0486* (2013.01)

(58) Field of Classification Search
CPC .......... B05D 7/53; B05D 3/0486; E03C 1/057
See application file for complete search history.

(56) References Cited

U.S. PATENT DOCUMENTS 8,479,765 B1 * 7/2013 Wren .................... E03C 1/0404 137/551
9,057,184 B2 * 6/2015 Meehan ................ E03C 1/0404
2005/0135099 A1 * 6/2005 Stuhlmacher. II .... F21V 33/004 362/253
2011/0209781 A1 * 9/2011 Fath .......................... E03C 1/04 137/551
2015/0308084 A1 10/2015 Thompson et al.
2017/0328048 A1 11/2017 Karei

FOREIGN PATENT DOCUMENTS

WO 2009/024219 2/2009

OTHER PUBLICATIONS

International Search Report dated Apr. 17, 2020, in International (PCT) Application No. PCT/EP2020/052702, with English translation.

* cited by examiner

*Primary Examiner* — Vishal Pancholi
(74) *Attorney, Agent, or Firm* — Wenderoth, Lind & Ponack, L.L.P.

(57) ABSTRACT

The invention relates to a sanitary fitting (1), at least comprising: —a fitting housing (2) having an outer surface (3); —a radiation transmitter (4) or radiation receiver (5) which is arranged at least in part in the fitting housing (2); and —a housing part (6) which covers, at least in part, the radiation transmitter (4) or radiation receiver (5) on the outer surface (3) of the fitting housing (2) and has a coating (7) that is translucent at least in part.

11 Claims, 1 Drawing Sheet

SANITARY FITTING HAVING A TRANSLUCENT COATING

Figure 1:
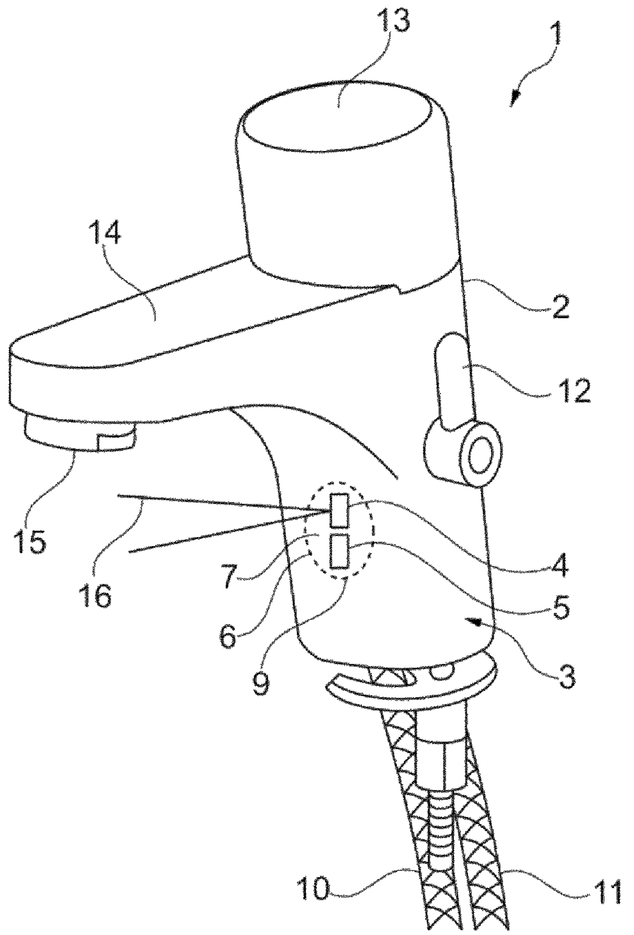

This invention relates to a sanitary fitting for the needs-based provision of a liquid. Such sanitary fittings are used in particular in connection with sinks, washbasins, showers and/or bathtubs.

Sanitary fittings having sensors, e.g., infrared sensors or radar sensors, which are used for controlling the sanitary fittings, are known. For example, a water flow can be automatically activated by such sensors if a user holds his/her hands under the sanitary fitting. To this end, the sensors must be arranged visibly on the sanitary fittings because the sensors are based on optical or electromagnetic detection processes. Sanitary fittings often have chrome layers on their surfaces, which damp or screen optical or electromagnetic beams of the sensors. Also known are sanitary fittings with radio interfaces, in which the chrome layer results in a reduced range of the radio beams. For this reason, regions on an outer surface of the fitting housings, in which the sensors are arranged, often cannot be coated with chrome. This results in an esthetically unappealing and/or non-uniform appearance of the sanitary fittings.

The object of the invention is therefore that of solving, at least in part, the problems described with respect to the prior art and in particular of providing a sanitary fitting which has a high-quality visual appearance.

This object is achieved with a device according to the features of the independent claim. Further advantageous designs of the sanitary fitting are given in the dependent claims. It should be noted that the features listed individually in the dependent claims can be combined with one another in any technologically useful manner and define further designs of the invention. Furthermore, the features given in the claims are further clarified and explained in more detail in the description, in which further preferred designs of the invention are presented.

A sanitary having at least the components listed below contributes thereto:

- a fitting housing having an outer surface;
- a radiation transmitter or radiation receiver, which is at least partially arranged in the fitting housing; and
- a housing part, which at least partially covers the radiation transmitter or radiation receiver on the outer surface of the fitting housing and has an at least partially translucent coating.

Sanitary fittings are used in particular for dispensing liquids, in particular ones such as water, on demand to sinks, washbasins, showers and/or bathtubs. To this end, the sanitary fittings can be supplied with cold water with a cold water temperature and hot water with a hot water temperature, which can be mixed by the sanitary fittings, for example by means of a mixing valve or a thermostatic mixing cartridge, to produce mixed water at a desired mixed water temperature. The cold water temperature is in particular at most 25° C. (Celsius), preferably 1° C. to 25° C., particularly preferably 5° C. to 20° C. and/or the hot water temperature is in particular at most 90° C., preferably 25° C. to 90° C., particularly preferably 55° C. to 65° C. The mixed water can then be supplied, for example via a liquid line and/or an outlet, to an outlet opening of the sanitary fitting, through which the mixed water exits the sanitary fitting.

The sanitary fitting has a fitting housing having an outer surface. The fitting housing is in particular the part of the sanitary fitting which can be used to secure the sanitary fitting to a support, for example a worktop. The fitting housing can be at least partially cast from plastic and/or metal, for example brass. In particular, the fitting housing can be cast, at least in part, from plastic and/or metal. The outer surface of the fitting housing can have a chrome coating, in order to give the sanitary fitting an appealing visual appearance. A layer thickness of the chrome coating is at least 0.2 μm (microns), preferably 0.2 μm to 0.4 μm. Such a layer thickness is required for a high resilience and durability of the chrome coating.

The sanitary fitting further comprises a radiation transmitter or radiation receiver. In particular, the sanitary fitting can have a radiation transmitter and/or a radiation receiver. The radiation transmitter is used for the transmission of radiation and the radiation receiver is used for the reception of radiation. The radiation can be in particular electrical, magnetic and/or electromagnetic radiation, for example infrared rays, radio beams and/or light. For example, a function of the sanitary fitting can be controlled and/or monitored by means of the radiation transmitter and/or the radiation receiver. To this end, the radiation transmitter and/or the radiation receiver can be connected to a control unit of the sanitary fitting. The control unit can comprise, for example, a microprocessor and/or an energy source. The radiation transmitter and/or the radiation receiver are at least partially arranged in the fitting housing. The outer surface of the fitting housing can have, for example, an opening for this purpose.

The sanitary fitting also comprises a housing part, which at least partially covers the radiation transmitter and/or the radiation receiver on the outer surface of the fitting housing. The housing part can be formed integrally or can be materially bonded to the rest of the fitting housing. In this case, the housing part is in particular a (delimitable) region of the fitting housing or of the outer surface of the fitting housing. The housing part can also constitute a separate component such that the fitting housing is formed of at least two parts. In particular, the opening in the outer surface of the fitting housing for the radiation transmitter and/or radiation receiver can be closed or covered by the housing part. The housing part preferably is flush with the adjacent outer surface of the fitting housing. This can mean that no gap is formed on the outer surface between the housing part and the fitting housing. The housing part can also be plate-shaped and/or lid-shaped.

The housing part has an at least partially or even (nearly) completely translucent coating, in particular such that in comparison to standard housing materials, any damping of the radiation transmitted by the radiation transmitter and/or of the radiation received by the radiation receiver as it passes through the housing part is (significantly) reduced or even (essentially) prevented. It is thus possible to increase a range of the radiation transmitted by the radiation transmitter and/or improve a reception of the radiation receiver. The translucent coating can be in particular a chrome-like coating. The translucent coating can comprise a clear varnish and a PVD metallization.

Furthermore, the opaque coating can have a particularly low layer thickness, in particular less than 2.0 μm (microns). The housing part having the translucent coating ensures both a high-quality visual appearance of the sanitary fitting and low damping of the transmitted and/or received radiation by the fitting housing.

A visual appearance of the translucent coating can (largely) match a visual appearance of the outer surface of the fitting housing. In other words, this can mean that the translucent coating of the housing part can look identical to the adjacent outer surface of the fitting housing. The term visual appearance includes in particular a color, a gloss and/or a surface quality.

The translucent coating can have a layer thickness of 0.1 μm to 0.4 μm, where appropriate to 0.2 μm. The layer thickness of the translucent coating is preferably at least 0.1 μm to 0.2 μm.

The translucent coating can be produced by a PVD process. The PVD process is in particular a coating process by means of physical vapor deposition.

According to embodiments, the PVD coating is not applied directly to a surface of the housing part, but to a base coat, which can serve as a spreader/sticker. According to further embodiments, at least one further coating (top coat) can be applied to the PVD coating as an alternative or in addition to the base coat under the PVD coating, in order to increase abrasion resistance and corrosion protection. When reference is made to the translucent coating herein, according to embodiments this can mean a /PVD layer/varnish multi-layer system (housing part-surface/substrate), a varnish/PVD layer multi-layer system (housing part-surface/substrate), a PVD layer/varnish multi-layer system (housing part-surface/substrate), the PVD layer alone or one of the other configurations of the translucent coating described herein. The provision of one or multiple varnish layers is an optional feature, which serves to improve the properties of the translucent layer.

The layer produced using the PVD process (which can be situated between the varnish layers, for example), can have a ceramic hard material layer having, e.g., a compound of a metal (e.g., zirconium or titanium) with the components of the reagent gases present in the PVD process (e.g., ZrCN/$TiO_2$/ZrN, etc.). A PVD coating thus formed can be customized in terms of the metallic look by means of the reactive gases. In this manner, other metal colors (gold/copper colors) can be generated in addition to a chrome-like appearance.

The translucent coating can be applied to an at least partially or completely translucent substrate. The substrate is in particular an outer surface of the housing part. The substrate can be at least partially composed of, for example, (transparent) plastic and/or glass.

The housing part can be at least partially set in an opening of the outer surface of the fitting housing. In particular, the opening of the outer surface of the fitting housing is thus closed by the housing part.

The housing part can be formed integrally with the fitting housing. This can mean that the housing part and the fitting housing are composed of the same material and/or are materially bonded to each other.

The radiation transmitter or radiation receiver can be a sensor. In particular, the radiation transmitter and/or the radiation receiver can be a sensor. For example, a user in a wash zone of the sanitary fitting can be detected by means of the sensor such that a liquid flow from the sanitary fitting can be automatically activated/deactivated.

The radiation transmitter or radiation receiver can be a light module. In particular, the radiation transmitter and/or the radiation receiver can be a light module. In particular, the light module can be an infrared module.

The radiation transmitter or radiation receiver can be a radio module. In particular, the radiation transmitter and/or the radiation receiver can be a radio module. For example, the radio module can be configured in the manner of a WLAN or Bluetooth module and be used for transmitting and/or receiving data. In particular, the data can be operational data and/or control data of the sanitary fitting.

The invention and the technical environment are explained in more detail below, with reference to the figures. Although the figures show a particularly preferred embodiment variant of the invention, it should be noted that this invention is not limited to this embodiment variant. Identical components in the figures are provided with the same reference symbols. Even if multiple (preferred) features of a sanitary fitting proposed herein are shown together in the figures, this does not mean that these features must always appear in combination with one another. Rather (and in the absence of explicit statements to the contrary), it is indeed possible to provide these features individually. The figures show by way of example and schematically:

FIG. 1: is a perspective view of a sanitary fitting; and

Figure 2:
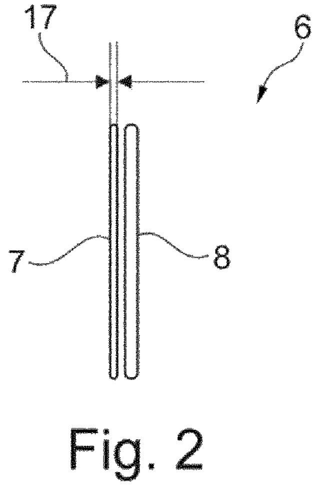

FIG. 2: is a sectional view of a housing part of the sanitary fitting.

FIG. 1 shows a sanitary fitting 1 in a perspective view. The sanitary fitting 1 comprises a fitting housing 2, in which a mixing valve (not visible here) is arranged for mixing cold water and hot water to produce mixed water. The cold water can be supplied to the mixing valve via a cold water line 10 and the hot water can be supplied to the mixing valve via a hot water line 11. A lever 12 for adjusting a desired mixed water temperature and a button 13 for actuating the mixing valve are arranged on the fitting housing 2. After the mixing valve is opened, the mixed water can flow from the mixing valve, via an outlet 14 of the fitting housing 2, out of an outlet opening 15. The sanitary fitting 1 additionally comprises a radiation transmitter 4 and a radiation receiver 5. The radiation transmitter 4 and the radiation receiver 5 are arranged in the fitting housing 2 and covered by a housing part 6. The housing part 6 closes an opening 9 in an outer surface 3 of the fitting housing 2. The radiation transmitter 4 and the radiation receiver 5 are arranged in the opening 9. Furthermore, the housing part 6 connects in a flush and gapless manner to the outer surface 3 of the fitting housing 2. The visual appearance of the translucent coating 7 matches the visual appearance of the adjacent outer surface 3 of the fitting housing 2 such that the housing part 6 cannot be detected on the outer surface 3 of the fitting housing 2. The housing part 6 is therefore depicted using a dashed line. Furthermore, the translucent coating 7 is embodied as chrome-like or reflective such that the radiation transmitter 4 and radiation receiver 5 behind it are not visible through the housing part 6 from the outside. Radiation 16 can be transmitted through the housing part 6 and the translucent coating 7 by means of the radiation transmitter 4. In a corresponding manner, radiation can be received through the housing part 6 and the translucent coating 7 by the radiation receiver 5. The damping of the transmitted and/or received radiation 16 is reduced by the translucent coating 7 in comparison to the remaining regions of the fitting housing 2.

FIG. 2 shows a schematic illustration of the housing part 6 of the sanitary fitting 1 shown in FIG. 1 in a cross section. The housing part 6 is planar here and designed in the manner of a lid. The translucent coating 7 is applied with a layer thickness 17 to a substrate 8 of the housing part 6.

LIST OF REFERENCE SYMBOLS

1 Sanitary fitting
2 Fitting housing
3 Outer surface
4 Radiation transmitter
5 Radiation receiver
6 Housing part
7 Translucent coating

8 Substrate
9 Opening
10 Cold water line
11 Hot water line
12 Lever
13 Button
14 Outlet
15 Outlet opening
16 Radiation
17 Layer thickness

The invention claimed is:

1. A sanitary fitting (1) comprising a fitting housing (2) having an outer surface (3), a radiation transmitter (4) or radiation receiver (5), which is at least partially arranged in the fitting housing (2), and a housing part (6), which at least partially covers the radiation transmitter (4) or radiation receiver (5) on the outer surface (3) of the housing fitting (2) and which has an at least partially translucent coating (7), wherein the translucent coating (7) has a layer thickness of 0.1 μm to 0.2 μm, and wherein the radiation transmitter (4) and/or the radiation receiver (5) is a sensor, whereby a user in a wash zone of the sanitary fitting (1) can be detected by means of the sensor such that a liquid flow from the sanitary fitting (1) can be automatically activated/deactivated.

2. The sanitary fitting (1) according to claim 1, wherein a visual appearance of the translucent coating (7) corresponds to a visual appearance of the outer surface (3) of the housing fitting (2).

3. The sanitary fitting (1) according to claim 1, wherein the translucent coating (7) is produced by a PVD process.

4. The sanitary fitting (1) according to claim 1, wherein the translucent coating (7) has a varnish (base coat), which is located directly on a surface of the housing part (6).

5. The sanitary fitting (1) according to claim 1, wherein the translucent coating has a transparent varnish (top coat), which forms an outermost layer of the translucent coating (7).

6. The sanitary fitting (1) according to claim 1, wherein the translucent coating (7) is applied to an at least partially translucent substrate (8).

7. The sanitary fitting (1) according to claim 1, wherein the housing part (6) is set at least partially in an opening (9) of the outer surface (3) of the housing fitting (2).

8. The sanitary fitting (1) according to claim 1, wherein the housing part (6) is formed integrally with the fitting housing (2).

9. The sanitary fitting (1) according to claim 1, wherein the radiation transmitter (4) or radiation receiver (5) is a light module.

10. The sanitary fitting (1) according to claim 1, wherein the radiation transmitter (4) or radiation receiver (5) is a radio module.

11. The sanitary fitting (1) according to claim 1, wherein the translucent layer (7) has the layer sequence varnish, PVD layer, varnish starting from a surface of the housing part (2).

* * * * *